US006826017B2

(12) United States Patent
Iwakura

(10) Patent No.: US 6,826,017 B2
(45) Date of Patent: Nov. 30, 2004

(54) MAGNETIC HEAD ASSEMBLY HAVING DAMPING PART INTEGRAL WITH GIMBAL

(75) Inventor: Masayuki Iwakura, Sizuoka-ken (JP)

(73) Assignee: Minebea Co., Ltd. (JP)

( * ) Notice: Subject to any disclaimer, the term of this patent is extended or adjusted under 35 U.S.C. 154(b) by 193 days.

(21) Appl. No.: 10/060,987

(22) Filed: Jan. 29, 2002

(65) Prior Publication Data

US 2002/0105759 A1 Aug. 8, 2002

(30) Foreign Application Priority Data

Jan. 30, 2001 (JP) ........................................ 2001-021585

(51) Int. Cl.[7] .............................. G11B 21/16; G11B 5/48
(52) U.S. Cl. ................................. 360/246.4; 360/245.6
(58) Field of Search ........................... 360/245.6, 246.4, 360/245.3, 246.1, 244, 240, 97.02; 369/247

(56) References Cited

U.S. PATENT DOCUMENTS 5,003,419 A * 3/1991 Takekado ................ 360/245.6
5,473,487 A * 12/1995 Nagase .................... 360/245.6
5,847,902 A * 12/1998 Clifford et al. ........... 360/245.6

FOREIGN PATENT DOCUMENTS

| JP | 59-151362 | | 8/1984 |
| JP | 62-66481 A | * | 3/1987 |
| JP | 7-192240 | | 7/1995 |

* cited by examiner

Primary Examiner—Julie Anne Watko
(74) Attorney, Agent, or Firm—Schulte Roth & Zabel; Joel Lutzker; Anna Vishev

(57) ABSTRACT

A magnetic head assembly that lessens undesired or harmful vibration is provided. A gimbal 2 of a magnetic head assembly 1 has an outskirt part 4, an intermediate part 7, and an inland part 10. The intermediate part 7 is arranged inside the outskirt part 4 with first aperture segments 5a and 5b therebetween, and is connected to the outskirt part 4 via first bridges 6a and 6b. The inland part 10 is arranged inside the intermediate part 7 and connected thereto via second bridges 9a and 9b and second damping parts 12a and 12b. The second bridges 9a and 9b and the second damping parts 12a and 12b act so as to modify the resonant frequency of the inland part 10. Additional damping parts may be provided.

30 Claims, 5 Drawing Sheets

MAGNETIC HEAD ASSEMBLY HAVING DAMPING PART INTEGRAL WITH GIMBAL

FIELD OF THE INVENTION

This invention concerns a magnetic head assembly; in particular, it concerns a magnetic head assembly for lessening the undesired or harmful vibration in a magnetic head in a floppy disk drive, etc.

BACKGROUND OF THE INVENTION

In a conventional magnetic head assembly including a magnetic head, when a recording medium rotates, a magnetic head piece that is part of the magnetic head and is in contact with the recording medium receives torque along its direction of rotation. This torque causes various types of twisting and bending stresses to act on the magnetic head piece. The magnetic head comprises a magnetic head piece and a magnetic head piece attachment plate (hereafter called "the gimbal"), which has elasticity. When the magnetic head piece comes into contact with the rotating magnetic medium, the magnetic head piece constantly moves up and down while tracking the magnetic medium. In this case, the gimbal vibrates along with the movement of the magnetic head piece, and has many modes of vibration. The magnetic head piece that is in contact with the recording medium is pulled rearward by the force of friction. The various forces are unnecessary or harmful, and at times an abnormal vibration of several kilohertz arises, making it impossible to record on to or play back from the recording medium.

In order to prevent the abnormal vibration, for example, unexamined patent S59-151362 [1984] and unexamined patent H7-192240 [1995] have been disclosed.

As shown in FIG. 5, the invention of unexamined patent S59-151362 [1984] has a gimbal 50 which has elasticity and to which the magnetic head piece is attached. First aperture segments 51a and 51b of a first aperture are provided between an outskirt part 53 and an intermediate part 55 of the gimbal 50. Bridges 54a and 54b support the first aperture. Second aperture segments 52a and 52b of a second aperture are provided between the intermediate part 55 and a rectangular inland part 56 to which the magnetic head piece is attached. Bridges 57a and 57b support the second aperture. Provided over part of the first aperture segments 51a and 51b or the second aperture segments 52a and 52b are junction parts 58a, 58b, and 58c that are formed of a resin which has a damper effect that absorbs vibration energy, solving the above problem by moving the vibration energy to other points.

And as shown in FIG. 6, the invention of unexamined patent H7-192240 [1995] has a gimbal 50', which has elasticity and to which a magnetic head piece is attached. First aperture segments 51a' and 51b' of a first aperture are provided between an outskirt part 53' and an intermediate part 55' of the gimbal 50'. Bridges 54a' and 54b' support the first aperture. Second aperture segments 52a' and 52b' are provided between the intermediate part 55' and a rectangular inland part 56' to which the magnetic head piece is attached. Bridges 57a' and 57b' support the second aperture. Projections 60a and 60b are provided at sides of a printed circuit board 61 to which a magnetic head 62 is connected. The projections 60a and 60b bridge and fix the second aperture segments 52a' and 52b' respectively, thereby solving the above problem.

In the unexamined patent S59-151362 [1984], there is a problem that applying a resin, that has the damper effect of absorbing vibration energy, not only requires a large number of manufacturing steps and cost, but also causes variability in the damper effect due to variability in the coating weight and coating position of the resin.

And in unexamined patent H7-192240 [1995] there is a problem that because force is concentrated on the gimbal 50' when the projections 60a and 60b are anchored to the printed circuit board 61, bending of the gimbal is often caused, and it is very difficult to work with.

SUMMARY OF THE INVENTION

This invention was devised for the purpose of solving these problems without detracting from trackability on the magnetic recording medium. A magnetic head assembly, in a floppy disk drive, for example, is provided that reduces unnecessary or harmful vibration.

In order to achieve the purpose, there is provided a magnetic head assembly, which comprises a magnetic head piece that records and plays back information; a gimbal which has elasticity and to which the magnetic head piece is attached; an oblong magnetic head support member where the gimbal is mounted toward the distal end and, such that the magnetic head piece faces a magnetic recording medium, the member is disposed above and below the medium in which the magnetic head piece is moved to a desired track position of the magnetic recording medium via the oblong magnetic head support member by an actuator provided on a proximal end of the oblong magnetic head support member; a gimbal comprises a roughly square shaped outskirt part that is attached to the oblong magnetic head support member, a roughly square shaped intermediate part that is positioned inside the outskirt part forming therebetween a first aperture squared with four aperture segments; the intermediate part connected to the outskirt part via two first bridges located respectively on two opposing aperture segments of the first aperture, and a rectangular inland part which is positioned inside the intermediate part forming therebetween a second aperture squared with four aperture segments; the inland part connected to the intermediate part via two second bridges provided respectively on two opposing aperture segments of the second aperture perpendicular to the aperture segments of the first aperture that have the first bridges and to which the magnetic head piece is attached; and first damping parts located on two opposing aperture segments of the first aperture perpendicular to the two opposing aperture segments joining the outskirt part and the intermediate part; second damping parts located on two opposing aperture segments of the second aperture perpendicular to the two opposing aperture segments having the second bridges, so as to join the intermediate part and the inland part.

According to an embodiment of the invention, a magnetic head assembly is provided wherein damping parts join the outskirt part and the intermediate part and are located in the first aperture perpendicular with the first bridges.

The damping parts that join the intermediate part and the inland part may be located in the second aperture perpendicular with the second bridges.

First damping parts join the outskirt part and the intermediate part and are located in the first aperture perpendicular with the first bridges and second damping parts join the intermediate part and the inland part, and are located in the second aperture perpendicular with the second bridges.

The damping part may form an S shape.

The invention may provide a magnetic head assembly having a plurality of the damping parts.

Further, the invention may provide a magnetic head assembly wherein the damping parts are located in a position opposite an aperture and aligned level.

Further still, the invention may provide a magnetic head assembly wherein the damping parts are located in a position oblique with respect to the center of the opposite side of the aperture.

Yet still further, the invention may provide a magnetic head assembly wherein one of first or second damping parts are located in a position opposite the aperture and aligned level and another of the first or second damping parts are located in a position oblique with respect to the center of the side of said aperture segment.

BRIEF DESCRIPTION OF THE DRAWINGS

FIG. 2(a) is a top view of the gimbal.

FIGS. 2(b), 2(c), 2(d), 2(e), 2(f), 2(g) are enlarged views showing the shape of part 12 in FIG. 2(a).

FIG. 4(a) shows the case in which the combination in FIG. 3 is the arrangement of Row 34a.

FIG. 4(b) shows the case in which the combination in FIG. 3 is the arrangement of Row 34b.

FIG. 4(c) shows the case in which the combination in FIG. 3 is the arrangement of Row 34d.

EMBODIMENTS OF THE INVENTION

Figure 1:
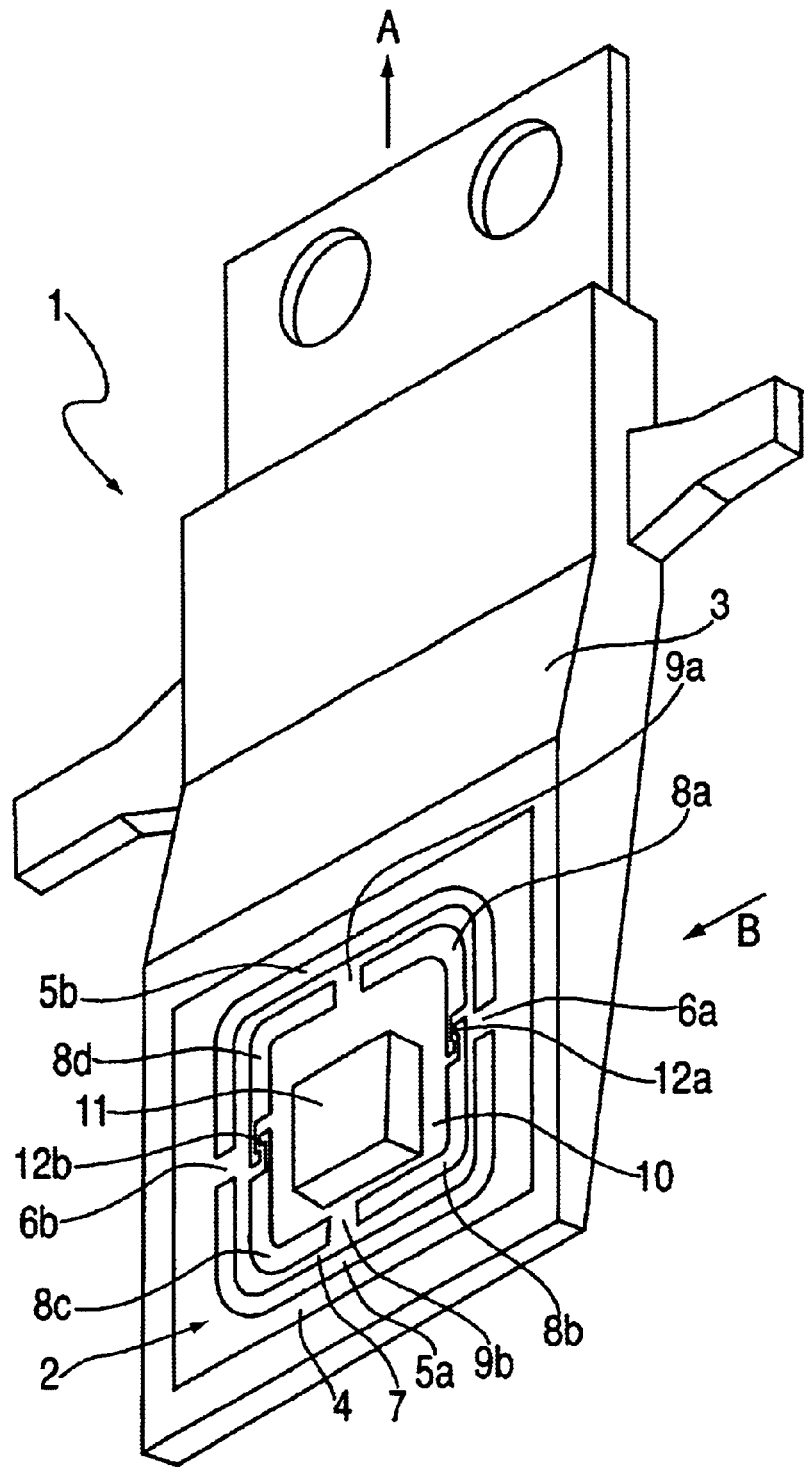
FIG. 1 is a perspective view of a magnetic head assembly according to the invention.
Figure 2A:
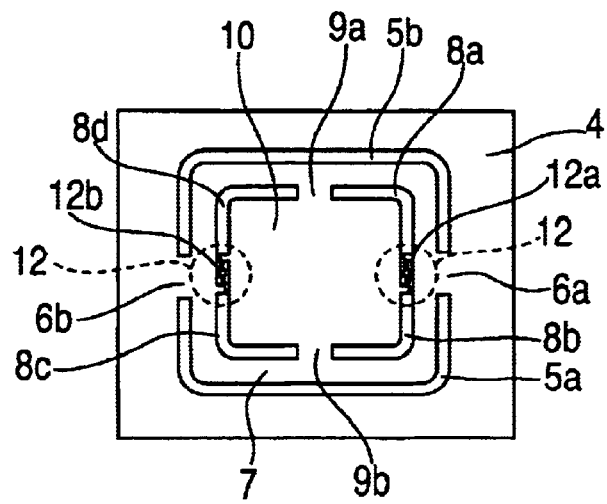
FIGS. 2(a) to 2(g) are diagrams for explaining a gimbal mounted on the magnetic head assembly according to the invention.
Figures 2B, 2C, 2D:
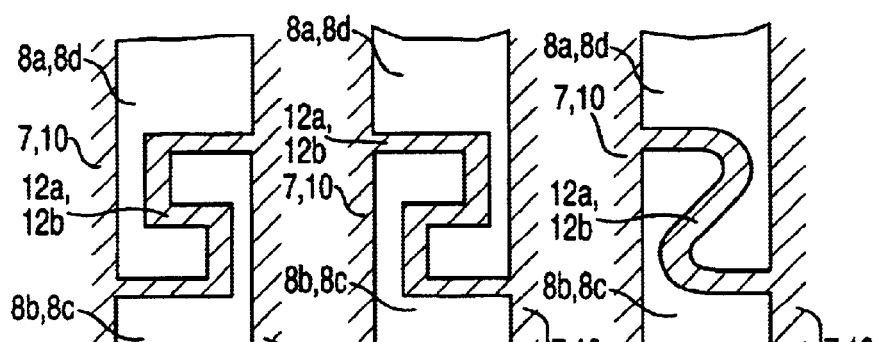
Figures 2E, 2F, 2G:
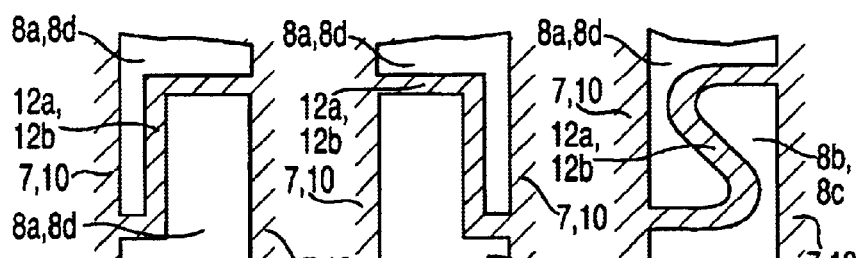
Figure 3:
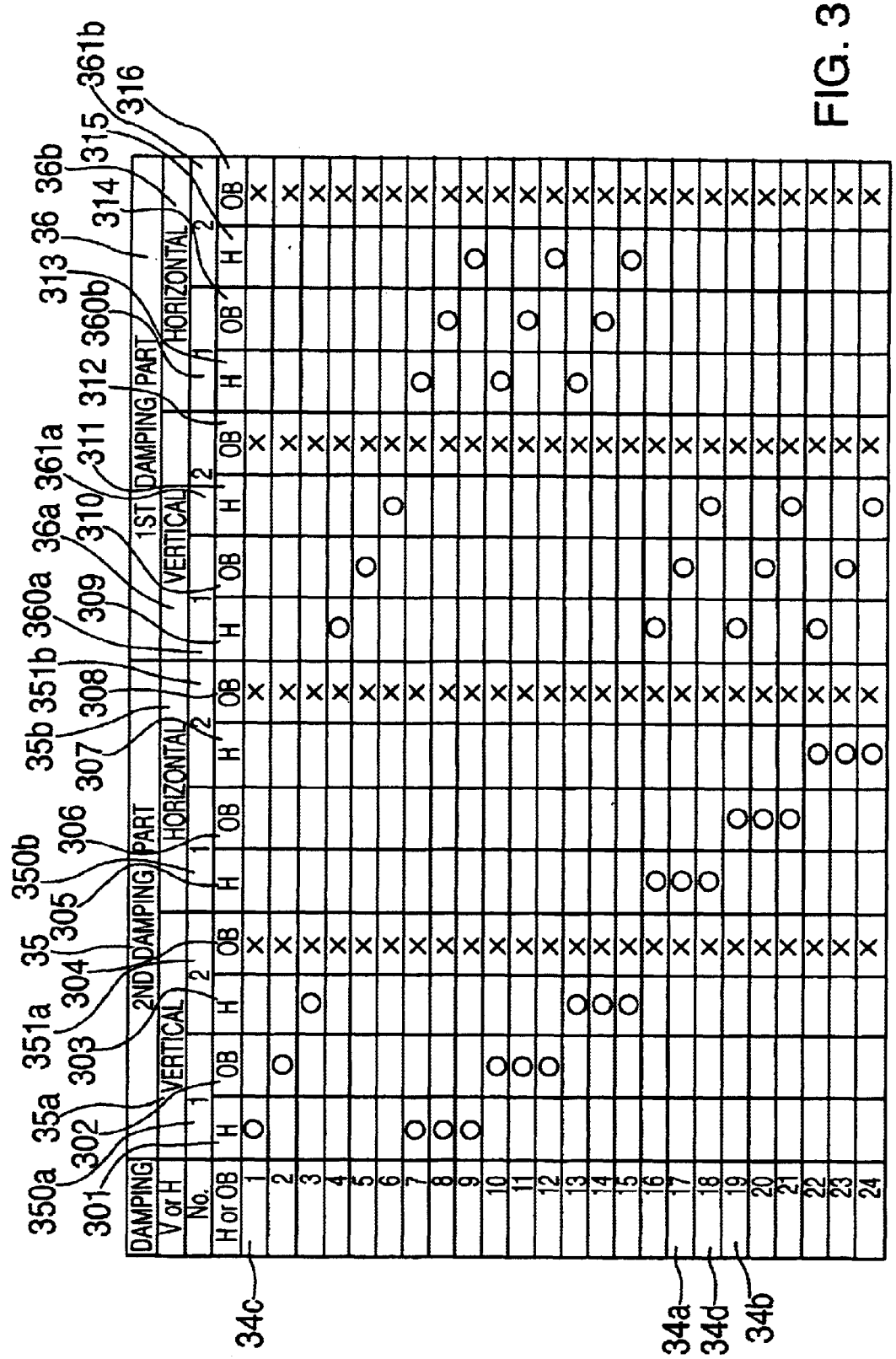
FIG. 3 is a diagram for explaining the position of the damping parts provided on the gimbal.

The following is a description of a first embodiment of this invention with reference to FIGS. 1 to 3.

FIG. 1 is a perspective view of a magnetic head assembly of this invention.

In FIG. 1, a magnetic head assembly 1 has a gimbal 2. This gimbal 2 has a roughly square-shaped outskirt part 4, which is held by a magnetic head support member 3, and a roughly square-shaped intermediate part 7. The intermediate part 7 is positioned inside the outskirt part 4 with a first aperture (first aperture segments 5a and 5b) therebetween and is connected via first bridges 6a and 6b to the outskirt part 4. The first bridges 6a and 6b are provided respectively on two opposing inner sides of the outskirt part 4, that is, outer sides of the intermediate part 7.

Provided inside the intermediate part 7 is a rectangular inland part 10 to which a magnetic head piece 11 is attached. The inland part 10 is positioned inside the intermediate part 7 with a second aperture (second aperture segments 8a, 8b, 8c and 8d) therebetween. The inland part 10 and the intermediate part 7 are connected to each other via second bridges 9a and 9b provided respectively on two opposing inner sides of the intermediate part 7, which are oriented perpendicular to the two outer sides of the intermediate part 7 that have the first bridges 6a and 6b.

Second damping parts 12a and 12b, which damp the vibration of the inland part 10, are provided on the two opposing inner sides of the intermediate part 7, which are perpendicular to the two outer sides of the intermediate part 7 having the second bridges 9a and 9b, so as to bridge the inland part 10 and the intermediate part 7.

That is, the intermediate part 7 and the inland part 10 are joined to each other by the second damping parts 12a and 12b, whereby a resonant frequency of the inland part 10, which originates from the second bridges 9a and 9b and causes harmful or abnormal vibration, can be altered.

On the gimbal 2, the second bridges 9a and 9b are positioned to be lined up in the direction A, which is the direction of movement by an actuator (not shown) of the magnetic head assembly 1. The first bridges 6a and 6b are positioned to be aligned along the direction B, the rotation of the disk (not shown).

FIGS. 2(a) to 2(g) are diagrams for explaining the gimbal of the invention. FIG. 2(a) is a top view of the gimbal 2, and FIGS. 2(b), 2(c), 2(d), 2(e), 2(f), and 2(g) are enlarged views showing the shape of the damping parts 12 in FIG. 2(a). The structure of the outskirt part 4 in FIGS. 2(a) to 2(g) as well as of the first aperture segments 5a and 5b, the first bridges 6a and 6b, the intermediate part 7, the second aperture segments 8a, 8b, 8c, 8d, the second bridges 9a and 9b, and the inland part 10 within the outskirt part 4, are the same as the structure of the gimbal described in FIG. 1. Accordingly, their description is omitted. The embodiment illustrated here includes only the second damping parts. However, first damping parts may also be used between the outskirts part 4 on the intermediate part 7, as discussed in detail with reference to FIG. 4.

In FIG. 2(a), the second damping parts 12a and 12b are provided respectively between the aperture segments 8a and 8b, and between the aperture segments 8d and 8c. The aperture segments are aligned perpendicular to the direction along which the second bridges 9a and 9b are aligned. And the first bridges 6a and 6b are positioned at two opposing outer sides of the intermediate part 7 that are perpendicular to the two inner sides of the intermediate part 7 that the second bridges 9a and 9b are on, that is, the first bridges 6a and 6b are aligned in the same direction as the second damping parts 12a and 12b are aligned.

The second damping parts 12a and 12b are positioned along the direction of rotation of the disk (not shown), and the magnetic head piece, which contacts the rotating disk, is pulled in direction of the rotation of the disk due to the force of friction. While the reaction force is absorbed by the second bridges 9a and 9b, the intermediate part 7 and the inland part 10 are joined to each other by the second damping parts 12a and 12b, thereby changing the resonant frequency of the inland part 10.

The second damping parts 12a and 12b are structured and positioned so as to have the effect of changing the resonant frequency of the inland part 10, as described above, and it is necessary that the operation of the gimbal not detract from the trackability to the magnetic recording medium. FIGS. 2(b), 2(c), 2(d), 2(e), 2(f), and 2(g) are diagrams showing the various shapes of the second damping parts. The inland part 10 and the intermediate part 7 are joined to each other by the second damping part 12a provided between the second aperture segments 8a and 8b and by the second damping part 12b provided between the second aperture segments 8c and 8d.

The shapes of second damping parts 12a and 12b in FIGS. 2(b) and 2(c) are roughly squared-off S shaped, and FIGS. 2(b) and 2(c) are symmetrical. The second damping parts 12a and 12b in FIGS. 2(d) and 2(e) are roughly S shaped, and FIGS. 2(d) and 2(e) are symmetrical. The second damping parts 12a and 12b in FIGS. 2(f) and 2(g) are crank shaped, and FIGS. 2(f) and 2(g) are symmetrical.

As to the damping part shapes described above, the designs in FIGS. 2(d) and 2(e) have the greatest damping effect. The designs in FIGS. 2(b) and 2(c), which are similar to those in FIGS. 2(d) and 2(e), rank next, and the designs in FIGS. 2(f) and 2(g) have the lowest damping effect. While FIGS. 2(b), 2(c), 2(f), and 2(g) have a simpler structure than FIGS. 2(d) and 2(e), the damping parts can be appropriately shaped by considering the damping effect in accordance with the size and material of the gimbal.

Figure 4A:
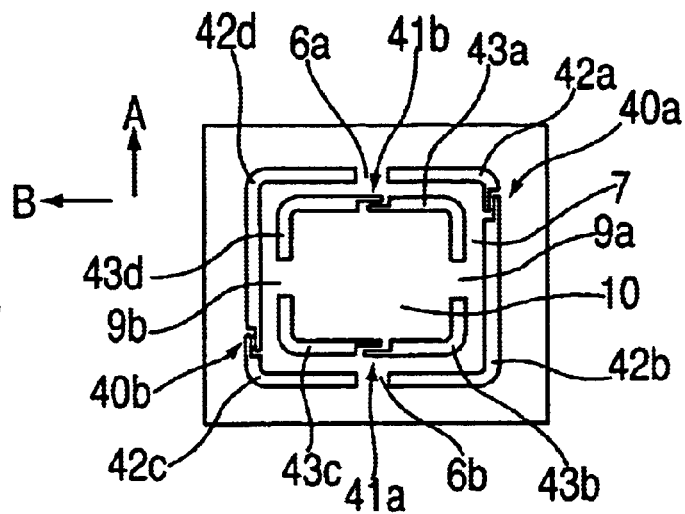
FIGS. 4(a) to 4(c) are diagrams showing another embodiment of the gimbal according to the invention.
Figure 4B:
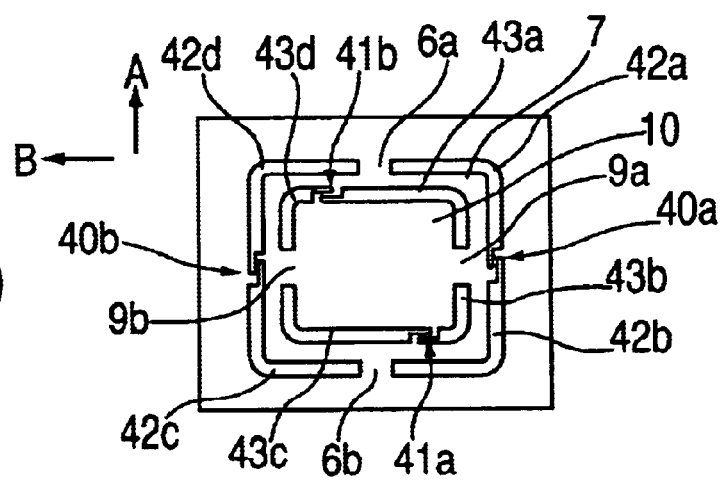

The second damping parts 12a and 12b are positioned respectively between the second aperture segments 8a and 8b and between the second aperture segments 8c and 8d on the two opposing inner sides of the intermediate part 7, that are perpendicular to the other two opposing inner sides of the intermediate part 7 with the second bridges 9a and 9b. In the case that first damping parts are provided, the first damping parts are provided respectively in the first aperture segments 5a and 5b and across from second bridges 9a and 9b. As with the second damping parts, the first damping parts may be provided at the first aperture segments 5a and 5b and positioned to be perpendicular to the direction along which the first bridges 6a and 6b are aligned, as shown in FIGS. 4(a) and 4(b). FIG. 4 will be discussed hereinafter.

FIG. 3 is a diagram for explaining the positions in which the aforesaid first and second damping parts are to be provided. As stated above, the gimbal has two apertures and two bridges. The damping parts can be provided in each of the two apertures between the respective two bridges. The number of the damping parts is not limited to one per aperture; multiple damping parts may be provided.

Figure 4C:
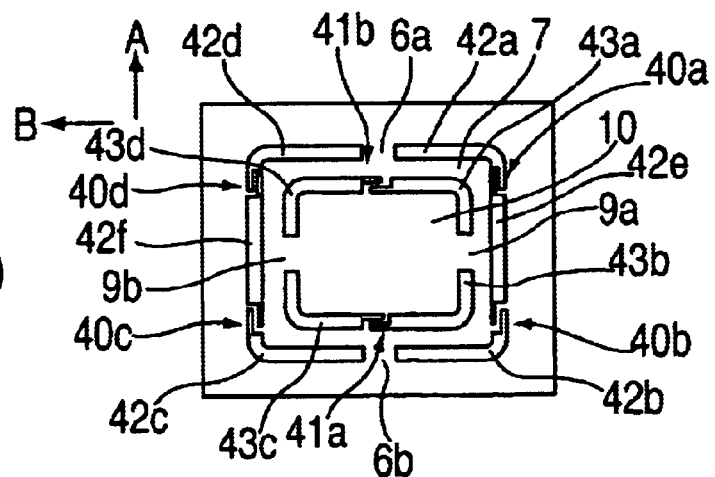
Figure 5:
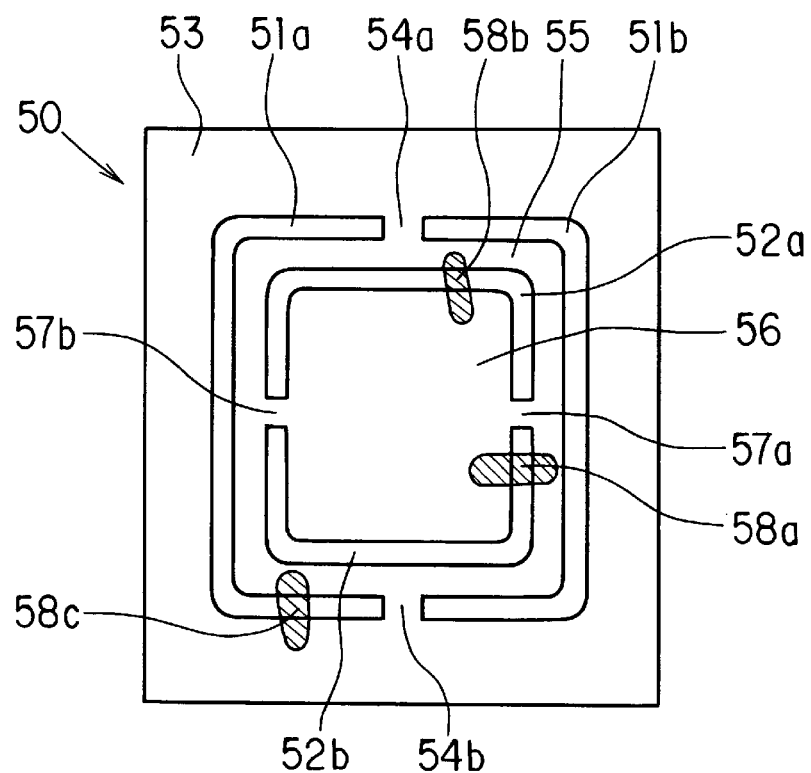
FIG. 5 is a diagram of the structure of a conventional gimbal.
Figure 6:
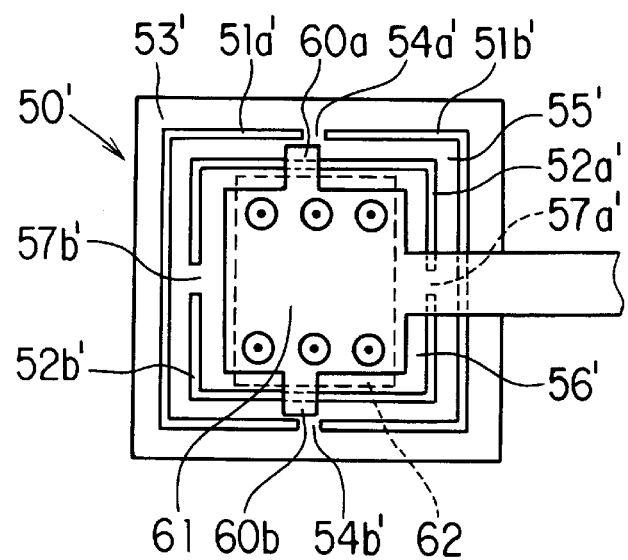
FIG. 6 is a diagram of another structure of a conventional gimbal.

Also, with regard to the position of the bridges, the second bridges 9a and 9b may be positioned along the direction A which is oriented toward an actuator (not shown) of the magnetic head assembly 1, while the first bridges 6a and 6b are along the direction of rotation of the disk (not shown). Alternatively, positioning may be such that the first bridges 6a and 6b are disposed along the direction A, which is oriented toward the actuator of the magnetic head 1, while the second bridges 9a and 9b are disposed along the direction B of rotation of the disk as shown in FIGS. 4(a), 4(b), and 4(c).

When the magnetic head piece is in contact with the rotating recording medium rotating, as the magnetic head piece moves, the gimbal vibrates in any of many vibration modes. Therefore, in order to absorb the many types of vibrations, the first bridges and second bridges must be positioned to be aligned perpendicular to each other.

FIG. 3 is a table of the typical position and number of the damping parts, prepared in consideration of the aforesaid vibration modes and combinations of damping part positioning. As stated above, there is shown a case in which the first bridges and the second bridges are positioned to be aligned perpendicular to each other. There are other positioning combinations available, though not shown.

In FIG. 3, the combinations of positions of the first damping parts in the first aperture are listed in column 36, and the combinations of positions of the second damping parts in the second aperture are listed in column 35. Each of the first and second apertures consists of four aperture segments forming a square. Looking at FIG. 1, the direction A oriented toward the actuator of the magnetic head assembly is defined as the vertical direction, and the direction B along the rotation of the disk is defined as the horizontal direction. The vertical aperture segments and the horizontal aperture segments of the second aperture are listed in columns 35a and 35b, respectively and the vertical aperture segments and the horizontal aperture segments of the first aperture are listed in column 36a and 36b, respectively.

Columns 350a, 350b, 360b list cases where one damping part is provided, and columns 351a, 351b, 361a, and 361b list cases where two damping parts are provided.

FIG. 3 further indicates if the damping parts are positioned to be aligned oblique or horizontal. The damping parts which are provided on opposing aperture segments and are positioned to be aligned level to each other are listed in columns 301, 303, 305, 307, 309, 311, 313, and 315 denoted by H. The damping parts which are provided on opposing aperture segments and positioned symmetrical with respect to the center of the inland part 10 so as to be aligned oblique and those arranged in the horizontal position of facing sides are listed in columns 302, 304, 306, 308, 310, 312, 314, and 316 denoted by OB.

Shown in FIG. 3 are 24 examples of damping part arrangements. For example, with the gimbal of FIG. 2(a), no first damping parts are provided at the first aperture, and two second damping parts are provided between the second aperture segments 8a and 8b and between the second aperture segments 8c and 8d (the vertical aperture segment), respectively, while the second bridges are provided on the horizontal aperture segments of the second aperture. Therefore, this corresponds to the arrangement of column 34c in FIG. 3.

Similarly, with the gimbal of FIG. 4(a), first damping parts 40a and 40b are provided on the vertical aperture segment of the first aperture so as to be aligned oblique between first aperture segments 42a and 42b and between first aperture segments 42c and 42d, respectively, and first bridges 6a and 6b are on the horizontal aperture segments of the first aperture. Also, on the horizontal aperture segment of the second aperture so as to be aligned, vertical second damping parts 41a and 41b are provided between second aperture segments 43b and 43c and between second aperture segments 43a and 43d, respectively, and second bridges 9a and 9b are on the vertical aperture segment of the second aperture. Therefore, this corresponds to the arrangement of column 34a in FIG. 3.

Also, with the gimbal of FIG. 4(b), first damping parts 40a and 40b are provided on the vertical aperture segment of the first aperture so as to be aligned level to each other between first aperture segments 42a and 42b and between first aperture segments 42c and 42d, respectively, and first bridges 6a and 6b are on the horizontal aperture segments of the first aperture. Also, damping parts 41a and 41b are provided on the horizontal aperture segments of the second aperture so as to be aligned oblique between second aperture segments 43b and 43c and between second aperture segments 43a and 43d, respectively, and second bridges 9a and 9b are on the vertical aperture segments of the second aperture. Therefore, this corresponds to the arrangement of column 34b in FIG. 3.

With the gimbal of FIG. 4(c), two first damping parts are provided on each of the vertical aperture segment of the first aperture. That is, first damping parts 40a and 40b are provided on one vertical aperture segment between first aperture segments 42a and 42e and between first aperture segments 42e and 42b, respectively, while first damping parts 40c and 40d are provided on the other vertical aperture segment between first aperture segments 42c and 42f and between first aperture segments 42f and 42d, respectively, and first bridges 6a and 6b are on the horizontal aperture segments of the first aperture. Also, second damping parts 41a and 41b are provided on the horizontal aperture segments of the second aperture so as to be aligned vertical between second aperture segments 43b and 43c and between second aperture segments 43a and 43d, respectively. Therefore, this corresponds to the arrangement of column 34d in FIG. 3.

The first damping parts 40a and 40b positioned to be aligned oblique in aforesaid FIG. 4(a) may be positioned to be symmetrical with respect to the line defined between the first bridges 6a and 6b. Similarly, the second damping parts 41a and 41b positioned to be aligned oblique in FIG. 4(b) may be positioned to be symmetrical with respect to the line defined between the second bridges 9a and 9b. Also, the damping parts are shaped as in FIG. 2(f) or 2(g), but may also be shaped in FIGS. 2(b), (c), (d), or (e).

Effects of the Invention

The invention is directed to a magnetic head assembly comprising a magnetic head which consists of a magnetic head piece that records and plays back information and a gimbal which has elasticity and to which the magnetic head piece is attached, and an oblong magnetic head support member where the gimbal is mounted toward the distal end. The magnetic head assembly is disposed above a magnetic recording medium such that the magnetic head piece faces the medium while another magnetic head piece is disposed below the medium. The magnetic head piece is moved to a desired track position of the medium via the magnetic head support member by an actuator provided on the proximal end of the magnetic head support member. The gimbal consists of a roughly square-shaped outskirt part which is held on the magnetic head support member. A roughly square-shaped intermediate part is provided inside the outskirt part. A first aperture squared with four aperture segments separates the outskirt part and the intermediate part. The intermediate part is connected to the outskirt part at first bridges provided respectively on the two opposing outer sides of the intermediate part. A rectangular inland part is provided inside the intermediate part. A second aperture squared with four aperture segments separates the intermediate part and an inland part. The inland part is connected to the intermediate part at second bridges provided respectively on the two opposing sides of the inland part. The magnetic head piece is attached to the inland part. In the above-described structure, first damping parts are provided in two opposing aperture segments of the first aperture perpendicular to the aperture segments having the first bridges so as to join the outskirt part with the intermediate part. Second damping parts are provided in two opposing aperture segments of the second aperture perpendicular to the two opposing aperture segments having the second bridges so as to join the intermediate part with the inland part. The resonant frequency of the inland part that generates undesired or harmful abnormal vibration can be changed without detracting from the trackability to the magnetic recording medium, and the magnetic head assembly of the invention is adapted to enable stable recording and playback.

The magnetic head assembly of the invention has the first damping parts or the second damping parts, or both, whereby the resonant frequency of the inland part is freely changed in accordance with the specifications of the gimbal, and the magnetic head assembly enables stable recording and playback.

In the magnetic head assembly of the invention, the first damping parts or the second damping parts are roughly S shaped, thereby enhancing the damping effect.

Although the invention has been described with reference to the preferred embodiments, it will be apparent to one skilled in the art that variations and modifications are contemplated within the scope of the invention. The drawings and description of the preferred embodiment are made by way of example rather than to limit the scope of the invention, and it is intended to cover within the spirit and scope of the invention all such changes and modifications.

We claim:

1. A gimbal for a magnetic head assembly comprising:
   a) an outskirt part;
   b) an intermediate part positioned inside said outskirt part across a first aperture and connected to said outskirt part via first bridges on opposite sides of said intermediate part;
   c) an inland part having a magnetic head piece attached thereto, positioned inside said intermediate part across a second aperture and connected to said intermediate part via second bridges; and
   d) a damping part joining one of
      i) said outskirt part and said intermediate part; and
      ii) said intermediate part and said inland part; wherein said damping part is a mutual and integral extension of said gimbal parts joined by said damping part.

2. A gimbal recited in claim 1, wherein said damping part is an integrated part of said gimbal fabricated from the same piece of material.

3. A gimbal recited in claim 1, wherein said second bridges are located on opposite sides of said inland part perpendicular to said opposite sides of said intermediate part having said first bridges.

4. A gimbal as recited in claim 1, wherein said damping part that joins said outskirt part and said intermediate part is located in said first aperture perpendicular to said first bridges.

5. A gimbal recited in claim 1, wherein said damping part that joins said intermediate part and said inland part is located in said second aperture perpendicular to said second bridges.

6. A gimbal recited in claim 1, wherein one said damping part joins said outskirt part and said intermediate part, and is located in said first aperture perpendicular to said first bridges and another said damping part joins said intermediate part and said inland part and is located in said second aperture perpendicular to said second bridges.

7. A gimbal recited in claim 1, wherein said damping part is roughly S shaped.

8. A gimbal recited in claim 1, where a plurality of damping parts are provided.

9. A gimbal recited in claim 1, wherein said damping part crosses an aperture and is on a side located in a position perpendicular to a bridge of that aperture.

10. A gimbal recited in claim 1, wherein said damping part is centered on a side of said gimbal.

11. A gimbal recited in claim 1, wherein said damping part is located in a position oblique with respect to a center of a side of an aperture.

12. A gimbal recited in claim 1, wherein one said damping part is located in a position centered on a side of said gimbal and another said damping part is located in a position oblique with respect to a center of a side of an aperture.

13. A gimbal recited in claim 1, wherein said first or second aperture is a cut out area.

14. A magnetic head assembly comprising:
   a) a magnetic head piece;
   b) a gimbal; and
   c) a magnetic head support member having said gimbal mounted thereon; said gimbal for a magnetic head assembly comprising:
      an outskirt part;
      an intermediate part positioned inside said outskirt part across a first aperture and connected to said outskirt part via first bridges on opposite sides of said intermediate part;
      an inland part having said magnetic head piece attached thereto, positioned inside said intermediate part across a second aperture and connected to said intermediate part via second bridges; and
      a damping part joining one of
         i) said outskirt part and said intermediate part; and
         ii) said intermediate part and said inland part; wherein said damping part is a mutual and integral extension of said gimbal parts joined by said damping part.

15. A magnetic head assembly comprising:
   a) a magnetic head piece that records and plays back information;
   b) a gimbal having elasticity and consisting of a square-shaped gimbal outskirt part;
   c) an oblong magnetic head support member with an end that mounts said gimbal, said member positioned either above or below an interposed magnetic recording medium in which said magnetic head piece is moved via said oblong magnetic head support member to a desired track position of said magnetic recording medium by an actuator provided on a base end side of said oblong magnetic head support member;

d) a square shaped gimbal intermediate part that is positioned inside said gimbal outskirt part via a first aperture and is connected to said gimbal outskirt part via two first bridges located on opposite sides of said gimbal intermediate part;

e) a rectangular gimbal inland part having said magnetic head piece attached thereto, positioned inside said gimbal intermediate part via a second aperture and which is connected to said gimbal intermediate part via two second bridges provided on opposite sides of said gimbal inland part and is perpendicular to the side that has said first bridges; and f) a damping part that either joins said gimbal outskirt part and said gimbal intermediate part located on said first aperture perpendicular to said first bridges or that joins said gimbal intermediate part and said gimbal inland part and is located on said second aperture perpendicular to said second bridges wherein said damping part is a mutual and integral part of said gimbal parts joined by said damping part.

16. A gimbal for a magnetic head assembly comprising:
a) an outskirt part;
b) an intermediate part positioned inside said outskirt part across a first aperture and connected to said outskirt part via first bridges on opposite sides of said intermediate part;
c) an inland part having a magnetic head piece attached thereto, positioned inside said intermediate part across a second aperture and connected to said intermediate part via second bridges; wherein said first aperture has a first aperture segment and a second aperture segment, and wherein the first aperture segment and the second aperture segment are shaped to form at least one first damping part.

17. A gimbal recited in claim 16, wherein said second aperture has a third aperture segment and a fourth aperture segment wherein the third aperture segment and the fourth aperture segment are shaped to form at least one second damping part.

18. A gimbal recited in claim 16, wherein said second bridges are located on opposite sides of said inland part perpendicular to said opposite sides of said intermediate part having said first bridges.

19. A gimbal as recited in claim 16, wherein said damping part joins said outskirt part and said intermediate part and is located in said first aperture perpendicular to said first bridges.

20. A gimbal recited in claim 16, wherein said damping part joins said intermediate part and said inland part and is located in said second aperture perpendicular to said second bridges.

21. A gimbal recited in claim 16, wherein one said damping part joins said outskirt part and said intermediate part, and is located in said first aperture perpendicular to said first bridges and another said damping part joins said intermediate part and said inland part and is located in said second aperture perpendicular to said second bridges.

22. A gimbal recited in claim 16, wherein the said damping part is roughly S shaped.

23. A gimbal recited in claim 16, wherein a plurality of damping parts are provided.

24. A gimbal recited in claim 16, wherein said damping part crosses an aperture and is on a side located in a position perpendicular to a bridge of that aperture.

25. A gimbal recited in claim 16, wherein said damping part is centered on a side of said gimbal.

26. A gimbal recited in claim 16, wherein said damping part is located in a position oblique with respect to a center of a side of said gimbal.

27. A gimbal recited in claim 16, wherein one said damping part is located in a position centered on a side of said gimbal and another said damping part is located in a position oblique with respect to a center of said side of said gimbal.

28. A gimbal recited in claim 16, wherein said first or second aperture segments are cut out areas.

29. A magnetic head assembly comprising:
a) a magnetic head piece;
b) a gimbal; and
c) a magnetic head support member having said gimbal mounted thereon; said gimbal for a magnetic head assembly comprising:
an outskirt part;
an intermediate part positioned inside said outskirt part across a first aperture and connected to said outskirt part via first bridges on opposite sides of said intermediate part;
an inland part having a magnetic head piece attached thereto,
positioned inside said intermediate part across a second aperture and connected to said intermediate part via second bridges; and
said first aperture having a first aperture segment and a second aperture segment, wherein the first aperture segment and the second aperture segment are shaped to form at least one first damping part.

30. A magnetic head assembly comprising:
a) a magnetic head piece that records and plays back information;
b) a gimbal having elasticity and consisting of a square-shaped gimbal outskirt part;
c) an oblong magnetic head support member with an end that mounts said gimbal, said member may be positioned either above or below an interposed magnetic recording medium in which said magnetic head piece is moved via said oblong magnetic head support member to a desired track position of said magnetic recording medium by an actuator provided on a base end side of said oblong magnetic head support member;
d) a square shaped gimbal intermediate part that is positioned inside said gimbal outskirt part via a first aperture having a first aperture segment and a second aperture segment wherein the first aperture segment and the second aperture segment are shaped to form at least one first damping part and is connected to said gimbal outskirt part via two first bridges located on opposite sides of said gimbal intermediate part; and
e) a rectangular gimbal inland part having said magnetic head piece attached thereto, positioned inside said gimbal intermediate part via a second aperture having a third aperture segment and a fourth aperture segment wherein the third aperture segment and the fourth aperture segment are shaped to form at least one second damping part and which is connected to said gimbal intermediate part via two second bridges provided on opposite sides of said gimbal inland part and is perpendicular to the side that has said first bridges.

* * * * *